United States Patent [19]

Le Viet

[11] 4,204,336
[45] May 27, 1980

[54] MICROWAVE FREEZE DRYING METHOD AND APPARATUS

[75] Inventor: Toai Le Viet, Corseaux, Switzerland

[73] Assignee: Societe d'Assistance Technique pour Produits Nestle S.A., Lausanne, Switzerland

[21] Appl. No.: 898,660

[22] Filed: Apr. 21, 1978

[30] Foreign Application Priority Data

Apr. 27, 1977 [CH] Switzerland ................ 5206/77

[51] Int. Cl.² .................................................. F26B 5/06
[52] U.S. Cl. ............................................. 34/5; 34/1; 34/92; 219/10.55 F; 219/10.55 M
[58] Field of Search ............... 219/10.55 A, 10.55 E, 219/10.55 M, 10.55 F; 34/5, 92, 1

[56] References Cited

U.S. PATENT DOCUMENTS

| | | | |
|---|---|---|---|
| 2,668,364 | 2/1954 | Colton | 34/92 |
| 3,020,645 | 2/1962 | Copson | 34/5 |
| 3,266,168 | 8/1966 | Smith, Jr. | 34/5 |

Primary Examiner—John J. Camby
Attorney, Agent, or Firm—Watson, Leavenworth, Kelton & Taggart

[57] ABSTRACT

A process and an apparatus for freeze-drying by means of microwaves, in which the product to be dried is placed on a support composed of a material which is transparent to microwave energy, covered with a layer of material which conducts electricity.

3 Claims, 1 Drawing Figure

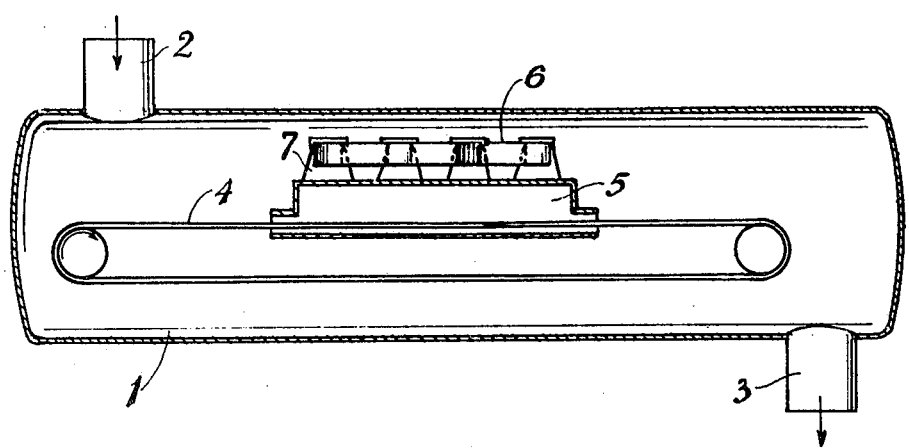

MICROWAVE FREEZE DRYING METHOD AND APPARATUS

This invention relates to a process and an apparatus for freeze-drying by means of microwaves.

Drying by means of microwaves theoretically affords the advantage of high speed, the energy being transferred into heat in the very centre of the product to be dried.

Freeze-drying by means of microwaves does however have the difficulty that ice absorbs 6000 to 8000 times less microwave energy than water, all other things being equal. The cooler the product, the less microwave energy it absorbs. The freeze-drying process by means of microwaves as it has been practised up till now is therefore slow.

The process according to the invention allows the duration of freeze-drying by means of microwaves to be reduced by an order of magnitude. The present invention provides a process for freeze-drying by means of microwaves, in which the product to be dried is placed on a support a part of which absorbs the microwave energy and conducts electricity.

In a preferred embodiment, the support is composed of a material which is transparent to microwave energy and is covered with a layer of carbon fibres embedded in an insulating material.

The present invention also provides an apparatus for freeze-drying by means of microwaves, comprising a vacuum chamber, a conveyor belt and a microwave applicator, the belt being made of a material which is transparent to microwave energy, covered with a layer of material which conducts electricity.

The accompanying drawing shows, by way of example, an embodiment of an apparatus for carrying out this process.

In the drawing, a vacuum chamber 1 for freeze-drying comprises an inlet 2 and an outlet 3, both provided with air locks. An endless belt 4 conveys the product from the inlet 2 to the outlet 3. It passes into a microwave applicator comprising a box, a sinuous waveguide 6 having a row of rectilinear sections joined by semi-circular parts, supplied with microwaves (wavelength in the waveguide 17.34 cm, power 5000 W) and radiators 7 directing the microwave energy into the box 5 and on to the belt 4.

The radiators are closed at the level of the upper wall of the box by windows made of a material, such as polytetrafluorethylene, which is permeable or transparent to microwaves and impermeable to gases. The box 5 is under vacuum in the same way as the chamber 1 whereas the waveguide 6 and the radiators 7 are at atmospheric pressure to prevent ionisation. The distance from the window to the product is about 40 cm.

The endless belt 4 is composed of a polytetrafluorethylene core reinforced with glass fibres and a surface layer of several tenths of a millimeter of carbon fibres embedded in silicone resin. This layer is produced by dipping the belt in a suspension of carbon fibres in liquid silicone and setting.

Other insulating materials such as rubber may be suitable for the belt and the surface layer. In a preferred embodiment, glass fibres are added to the carbon fibres in order to increase their mechanical strength. As is known, carbon absorbs microwave energy and is a conductor of electricity.

The absorbition of energy by the conveyor belt increases the speed of drying in an extraordinary way. The belt is brought to 250° C. in a few seconds. The product (frozen coffee extract) enters the box 5 at −40° C. and leaves it at +40° C.

The rise in the temperature of the product by means of the belt increases its absorbtion of microwave energy. The product may be dried to 2–3% of moisture in about two minutes compared to about 40 minutes with microwave heating acting solely on the product in the case of a conventional belt made of microwave-permeable polytetrafluorethylene. The duration of heating itself is a fraction of the duration of freeze-drying: the former may take some 50 seconds and the latter approximately 150 seconds for example.

I claim:

1. In the freeze-drying of a product which employs apparatus including a source of microwave energy and a support disposed below said source and upon which said product is received, the steps of providing said support as a two-layer component, absorbing microwave energy and conducting electricity in the upper one of said layers, and transmitting energy through the lower one of said layers.

2. An apparatus for freeze-drying a product by subjecting it to microwave energy, said apparatus comprising a vacuum chamber, a microwave applicator, and a conveyor belt for receiving the product and transporting it through said chamber past said applicator, the belt having a product receiving surface layer of a material which conducts electricity and comprising carbon fibers embedded in an insulating material, with the belt structure underlying said layer being capable of transmitting microwave energy and comprising polytetrafluorethylene.

3. The apparatus of claim 2 in which said product receiving layer further comprises glass fibers.

* * * * *